(12) United States Patent
Paine et al.

(10) Patent No.: US 11,262,033 B2
(45) Date of Patent: *Mar. 1, 2022

(54) PORTABLE LIGHT TOWER

(71) Applicant: Weekend Concepts, Inc., Paso Robles, CA (US)

(72) Inventors: Ryan T. Paine, Paso Robles, CA (US); Ronald P. Scott, Paso Robles, CA (US); Kyle J. Newman, Templeton, CA (US); Kyle A. Wilson, San Luis Obispo, CA (US)

(73) Assignee: Weekend Concepts, Inc., Paso Robles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/139,608

(22) Filed: Dec. 31, 2020

(65) Prior Publication Data
US 2021/0123575 A1    Apr. 29, 2021

Related U.S. Application Data

(63) Continuation of application No. 16/388,699, filed on Apr. 18, 2019, now Pat. No. 10,907,777.

(51) Int. Cl.
*F21L 14/00* (2006.01)
*F16M 11/28* (2006.01)
(Continued)

(52) U.S. Cl.
CPC ............... *F21L 14/00* (2013.01); *B60Q 1/24* (2013.01); *B60Q 1/305* (2013.01); *F16M 11/28* (2013.01);
(Continued)

(58) Field of Classification Search
CPC .......... F21L 14/00; B60Q 1/24; B60Q 1/305; F21M 11/28; F21M 13/022; F21V 21/145; F21V 21/16; F21V 21/22; F21V 23/002
(Continued)

(56) References Cited

U.S. PATENT DOCUMENTS 5,161,874 A * 11/1992 Benes ............... B60Q 1/32
362/552
6,409,367 B1 ‡ 6/2002 Pratt ............... B60R 9/06
362/50
(Continued)

OTHER PUBLICATIONS

Paine et al; U.S. Appl. No. 16/388,699, filed Apr. 18, 2019.
(Continued)

*Primary Examiner* — Laura K Tso
(74) *Attorney, Agent, or Firm* — Fitch, Even, Tabin & Flannery LLP

(57) ABSTRACT

A portable apparatus for mounting lights is described. The portable apparatus may include an attachment frame configured to removably mount to and be supported by a 3-point hitch connection of a tractor, a generally vertical main post having an upper end and a lower end, where a lower portion of the main post is rigidly coupled to the attachment frame, and a generally horizontal mounting beam rigidly coupled to the upper end of the main post at a center portion of the beam, and where the mounting beam includes a plurality of vertical light mounting bars, where each light mounting bar is coupled to the mounting beam.

17 Claims, 13 Drawing Sheets

(51) Int. Cl.
  *F16M 13/02* (2006.01)
  *F21V 21/16* (2006.01)
  *F21V 21/22* (2006.01)
  *F21V 21/14* (2006.01)
  *F21V 23/00* (2015.01)
  *B60Q 1/24* (2006.01)
  *B60Q 1/30* (2006.01)

(52) U.S. Cl.
  CPC ......... *F16M 13/022* (2013.01); *F21V 21/145* (2013.01); *F21V 21/16* (2013.01); *F21V 21/22* (2013.01); *F21V 23/002* (2013.01)

(58) Field of Classification Search
  USPC .............................................. 362/249.09, 485
  See application file for complete search history.

(56) References Cited

U.S. PATENT DOCUMENTS

| | | | | |
|---|---|---|---|---|
| 6,517,225 | B1 * | 2/2003 | Allen | B60P 3/18 362/485 |
| 6,734,792 | B1 ‡ | 5/2004 | McElveen | B60Q 1/2661 340/32 |
| 6,886,968 | B1 ‡ | 5/2005 | Hamelink | B60D 1/58 280/16 |
| 7,008,088 | B2 ‡ | 3/2006 | Pisciotti | B60Q 1/305 362/48 |
| 7,690,670 | B1 ‡ | 4/2010 | Lincul | B60D 1/36 280/477 |
| 7,780,323 | B2 ‡ | 8/2010 | Nolle | B60R 9/06 362/54 |
| 7,988,343 | B2 * | 8/2011 | Palmisano, Jr. | F21V 27/00 362/424 |
| 9,305,475 | B2 ‡ | 4/2016 | White | F21L 4/08 |
| 10,907,777 | B2 | 2/2021 | Paine | |
| 2003/0128105 | A1 ‡ | 7/2003 | Shaw | B60Q 1/22 340/43 |
| 2016/0033119 | A1 * | 2/2016 | Mumma | F21S 9/02 362/249.09 |
| 2016/0129742 | A1 ‡ | 5/2016 | Erickson | B60D 1/58 280/400 |
| 2016/0167568 | A1 ‡ | 6/2016 | Salami, Jr. | B60Q 1/0088 362/52 |
| 2017/0113601 | A1 ‡ | 4/2017 | McCurdy | B60Q 1/05 |
| 2017/0114966 | A1 ‡ | 4/2017 | McCurdy | B60D 1/58 |
| 2017/0259730 | A1 ‡ | 9/2017 | Carroll | B60P 3/18 |
| 2020/0332971 | A1 | 10/2020 | Paine | |

OTHER PUBLICATIONS

USPTO; Final Office Action for U.S. Appl. No. 16/388,699 dated May 28, 2020.
USPTO; Non-Final Offcie Action from U.S. Appl. No. 16/388,699 dated Nov. 4, 2019.
USPTO; Notice of Allowance for U.S. Appl. No. 16/388,699 dated Oct. 2, 2020.
YouTube; "Lazer Star Lights—Harvest Light Tower"; https://youtube.com/watch?v=HnnzXo7eeBY&feature=youtu.be; published Apr. 26, 2018.

\* cited by examiner
‡ imported from a related application

PORTABLE LIGHT TOWER

This application is a continuation of U.S. application Ser. No. 16/388,699, filed Apr. 18, 2019, for PORTABLE LIGHT TOWER, which is incorporated in its entirety herein by reference.

BACKGROUND OF THE INVENTION

1. Field of the Invention

The present invention relates generally to a light mounting apparatus, and more specifically to a portable light tower.

2. Discussion of the Related Art

Tractors often include a standard 3-point hitch connection for coupling a hitch or other accessory to the rear of the tractor. The standard hitch connection includes three link arms extending generally horizontally from the rear of the tractor. Two link arms are at a lower elevation, and one link arm is at an upper elevation, whereby the relationship of the arms is triangular. The end of each link arm distal to the tractor includes a hole for a pin connection to the hitch/accessory.

Light towers are often required for various applications at remote locations, such as for farming or construction. There exists a need for a light tower that can be mounted to a tractor and driven to the required location.

SUMMARY

A portable apparatus for mounting lights is described. The portable apparatus may include an attachment frame configured to removably mount to and be supported by a 3-point hitch connection of a tractor, a generally vertical main post having an upper end and a lower end, wherein a lower portion of the main post is rigidly coupled to the attachment frame, and wherein a height of the main post is vertically adjustable, and a generally horizontal mounting beam rigidly coupled to the upper end of the main post at a center portion of the beam, wherein a left length of the mounting beam and a right length of the mounting beam are independently adjustable, and wherein the mounting beam includes a plurality of vertical light mounting bars, wherein each light mounting bar is coupled to the mounting beam.

A method of producing a portable light tower is described. The method may include providing an attachment frame configured to removably mount to and be supported by a 3-point hitch connection of a tractor, providing a generally vertical main post having an upper end and a lower end, wherein a lower portion of the main post is rigidly coupled to the attachment frame, and wherein a height of the main post is vertically adjustable, and providing a generally horizontal mounting beam rigidly coupled to the upper end of the main post at a center portion of the beam, wherein a left length of the mounting beam and a right length of the mounting beam are independently adjustable, and wherein the mounting beam includes a plurality of vertical light mounting bars, wherein each light mounting bar is coupled to the mounting beam.

A method for moving a portable light tower is described. The method may include providing a tractor with a 3-point hitch connection at a first location, providing a light tower comprising: a lower attachment frame configured to removably mount to and be supported by a 3-point hitch connection of a tractor; a generally vertical main post having an upper end and a lower end, wherein a lower portion of the main post is rigidly coupled to the attachment frame, wherein a height of the main post is vertically adjustable; a generally horizontal mounting beam rigidly coupled to the upper end of the main post at a center of the beam, wherein a left length of the mounting beam and a right length of the mounting beam are independently adjustable, and further comprising a plurality of vertical light mounting bars, wherein each light mounting bar is coupled to the mounting beam; and a plurality of light fixtures, wherein each light is mounted to the mounting beam; mounting the light tower to the 3-point hitch connection via the attachment frame, whereby the light tower is entirely supported by the tractor; and, and driving the tractor to a second location.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In this application, "inner" is used to refer to a side facing towards the tractor when the apparatus is coupled to a tractor, and "outer" is used to refer to the opposite side, i.e. the side facing away from the tractor. "Left" and "right" correspond to the orientation of a person facing the rear of the tractor. The front elevation of the apparatus is the elevation viewed when the person is facing the rear of the tractor.

Figure 1:
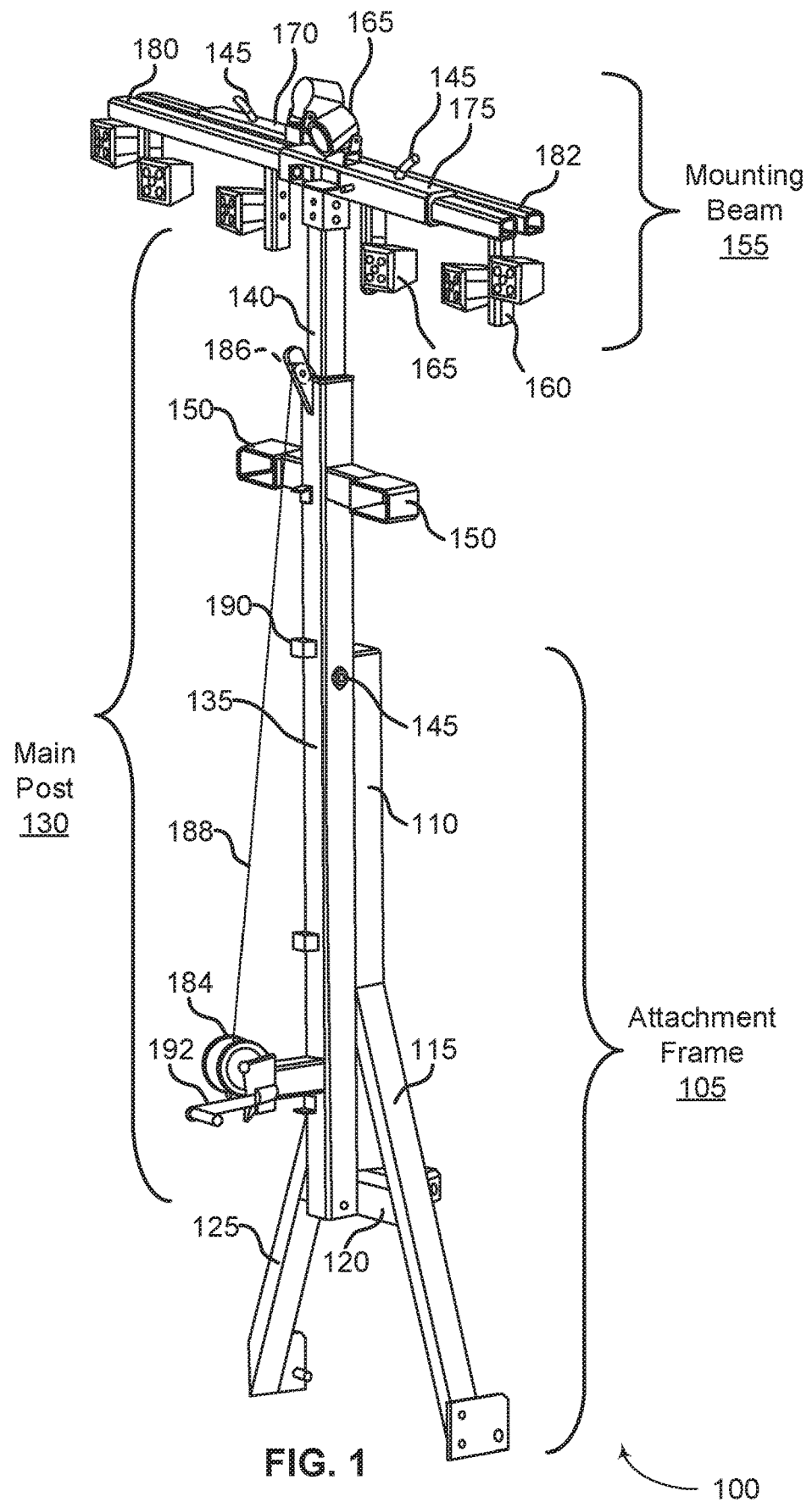
FIG. 1 shows an example of a perspective view of a non-extended light tower in accordance with aspects of the present disclosure.

FIG. 1 shows an example of a perspective view of a non-extended light tower 100 in accordance with aspects of the present disclosure. Light tower 100 may include attachment frame 105, main post 130, mounting beam 155, and winch assembly 184. Light tower 100 may be an example of, or include aspects of, the corresponding element or elements described with reference to FIGS. 2, 3, 7, 8, and 11. Power cords (such as the power cords 815 shown in FIG. 8) are not shown for clarity.

The light tower 100 comprises a lower attachment frame 105, an adjustable length intermediate vertical main post 130 coupled to the attachment frame 105, and an upper horizontal mounting beam 155 coupled to the main post 130. The attachment frame 105 is configured to removably couple to and be supported by a standard 3-point hitch connection of a tractor. The attachment frame 105 in the present embodiment comprises a lower A-frame 115 and an upper vertical brace member 110 rigidly coupled to and extending upward from an apex of the A-frame 115.

Figure 4:
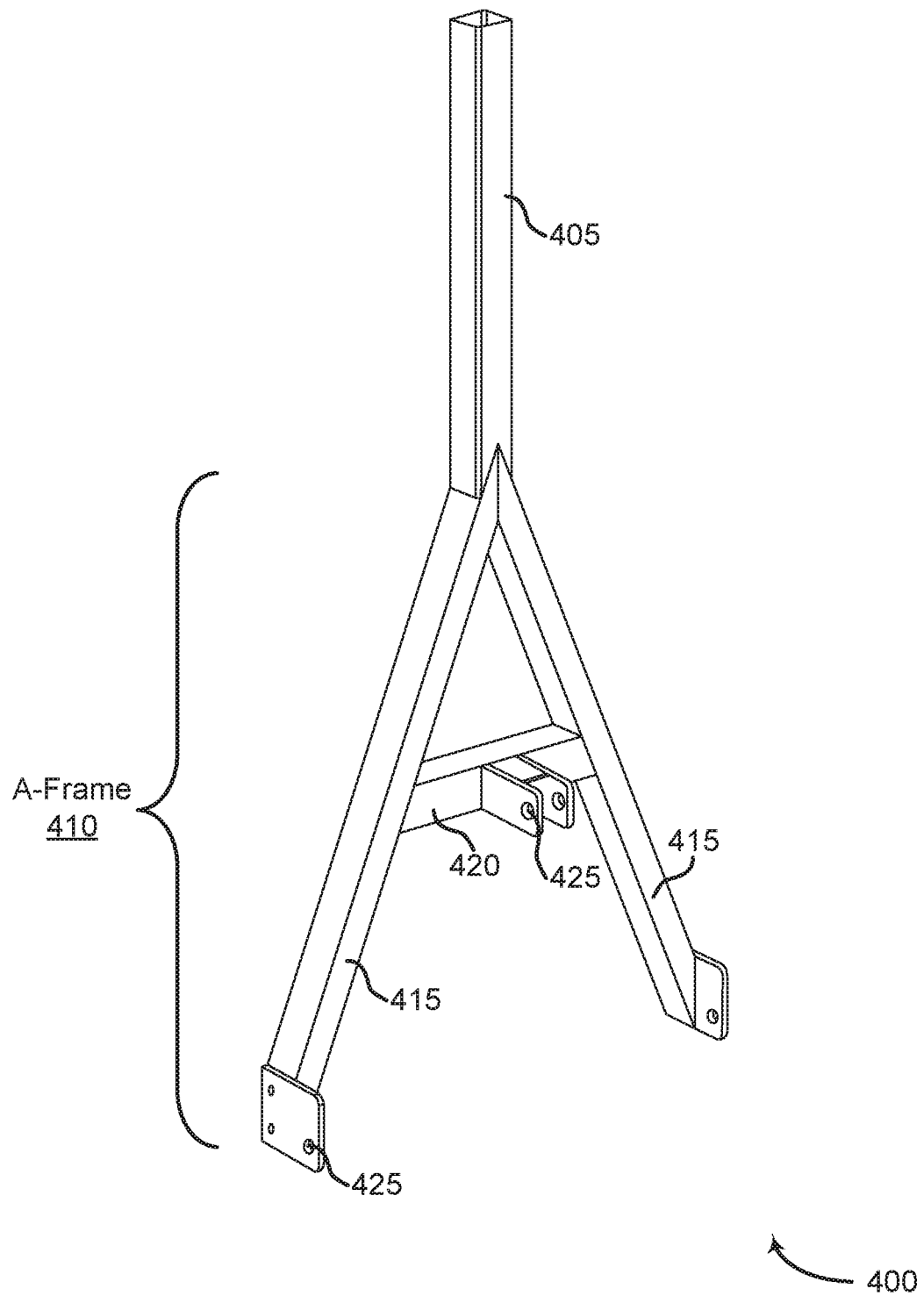
FIG. 4 shows an example of a perspective view of an attachment frame of the light tower in accordance with aspects of the present disclosure.

In the present embodiment the lower portion of the attachment frame 105 is an A-shape (comprising two downward-angled legs 125 connected at an upper apex and a horizontal cross-bar connecting the two legs 125). The vertical brace member 110 extends upward from the apex of the A-frame 115. In the present embodiment the vertical brace member 110 is between 30 inches (0.76 meters) and 32 inches (0.81 meters). The lower end of each A-frame leg 125 is configured to removably couple to one of the lower link arms of the standard 3-point hitch connection, for example using holes 425 as shown in FIG. 4. The A-frame cross bar 120 is configured to removably couple to the upper link arm of the standard 3-point hitch connection, whereby a 3-point connection is formed between a tractor and the light tower 100 when the light tower 100 is installed on and supported by the tractor, whereby the light tower 100 can be relocated using the tractor. In the present embodiment the brace member 110, the A-frame legs 125 and the A-frame center cross bar 120 are square tube members.

In one embodiment, an angle between the A-frame lower legs 125 is between 45 and 55 degrees and a height of the A-frame 115 is between 40 inches (1.02 meters) and 50 inches (1.27 meters). The attachment frame 105 and/or the main post 130 may include a plurality of recurring loops forming power cord holders 190 configured to receive electrical cables/power cords running down from the top of the light tower 100. In some embodiments additional accessories may be coupled to the attachment frame 105, for example an accessory for holding a cylindrical water cooler attached to the upper portion of the attachment frame 105. In some embodiments the A-frame 115 is coupled to the tractor using category 1, 2 or 3 hitch mounting pins.

The main post 130 comprises a generally vertical tubular outer sleeve member 135 rigidly coupled to the attachment frame 105. In the present embodiment the main post outer sleeve is juxtaposed with and coupled to the center cross bar 120 and the brace member 110 at the outer side of the attachment frame 105. A generally vertical tubular inner sleeve member 140 is configured fit within and slidably couple to the outer sleeve member 135. The slidable coupling provides for vertical adjustability of the height of the light tower 100. The height of the light tower 100 is adjusted by a winch coupled to a lower portion of the main post outer sleeve member 135 on the outer side of the light tower 100. A cable 188 connects a winch assembly 184 to a pulley 186 coupled to an upper end of the main post outer sleeve member 135. The cable 188 then runs from the pulley 186 through a slot 530 in the main post inner sleeve member 140 and down the main post inner sleeve member 140 where it is anchored on the main post inner sleeve member 140 proximate to the lower end of the main post inner sleeve member 140. In the present embodiment bracket 535 is coupled to the interior of the inner sleeve member 140 and the cable 188 is coupled to the bracket 535. The slot 530 and bracket 535 are shown below in FIG. 535.

The height of the light tower 100 is adjusted by rotating the crank of the winch assembly 184, which raises or lowers the main post inner sleeve member 140 relative to the location of the stationary main post outer sleeve member 135. In the present embodiment the height of the light tower apparatus 100 is adjustable from approximately 10'-0" (3.05 meters) to 14'-0" (4.27 meters).

The location of the main post inner sleeve member 140 is removably fixed by a lock pin 145 inserted in the outer sleeve and inner sleeve lock pin holes. In the present embodiment the winch assembly 184 is operated by a manual crank 192, although in other embodiments the winch mechanism may be motor-driven.

The main post outer sleeve member 135 may include two short, generally horizontal side extensions, forklift brackets 150, one on each side of the lower portion, each configured for receiving the fork of a forklift. In the present embodiment the outer sleeve member 135 and inner sleeve member 140 may be square tube members.

In some embodiments additional accessories may be coupled to the attachment frame 105 or main post outer sleeve, for example an accessory for removably mounting a cylindrical water cooler to the light tower 100. In some embodiments, a plurality of power cord holders 190 are coupled to the main post 130 and configured to guide the power cords supplying power to the lights.

The horizontal mounting beam 155 is rigidly coupled to the top end of the main post inner sleeve to form a general T-shape, where the beam is oriented in the same general plane as the A-frame 115 (i.e. generally perpendicular to a longitudinal axis of the tractor when the light tower 100 is coupled to the tractor.).

The mounting beam 155 comprises a left outer sleeve member 170 rigidly coupled to a right outer sleeve member 175. The left and right outer sleeves 175 are located on the same horizontal plane and overlapped at the central portion of the mounting beam 155. In the present embodiment the left outer sleeve 170 and the right outer sleeve 175 are overlapped between 5 inches (127 mm) and 12 inches (305 mm). The left outer sleeve member 170 extends away from the main post 130 on a left side of the light tower 100, and the right outer sleeve member 175 extends away from the main post 130 on a right side of the light tower 100.

A left inner sleeve 182 is configured to fit within and be slidably coupled to the left outer sleeve 170. The leftward extent of the left inner sleeve 182 is adjusted by sliding the left inner sleeve 182 with respect to the left outer sleeve 170, and removably fixing the leftward extent of the left inner sleeve 182 by a lock pin 145 inserted in left inner sleeve 182 and left outer sleeve 170 lock pin 145 holes. The right inner sleeve 180 is similarly configured relative to the right outer sleeve 175, whereby the rightward extent of the right inner sleeve 180 is adjusted. In the present embodiment each inner sleeve is adjustable from a distance of approximately 2'-8" (0.81 meters) from the centerline of the main post 130 to a distance of approximately 5'-0" (1.52 meters) from the centerline of the main post 130.

A plurality of light mounting bars 160 are coupled to and extend vertically downward from an underside of the mounting beam 155. In the present embodiment, a first right light mounting bar 160 is coupled to the right outer sleeve 175 on the right side of the mounting beam 155, and a second right light mounting bar 160 is coupled to the right inner sleeve 180 proximate to the right end of the right outer sleeve 175. Similarly, a first left light mounting bar 160 is coupled to the left outer sleeve 170 on the left side of the mounting beam 155, and a second left light mounting bar 160 is coupled to the left inner sleeve 182 proximate to the left end of the left outer sleeve 170. In the present embodiment, the light mounting bars 160 comprise rectangular tube sections. In the present embodiment, the light mounting bars 160 are approximately 8 inches (203 mm) long.

Figure 7:
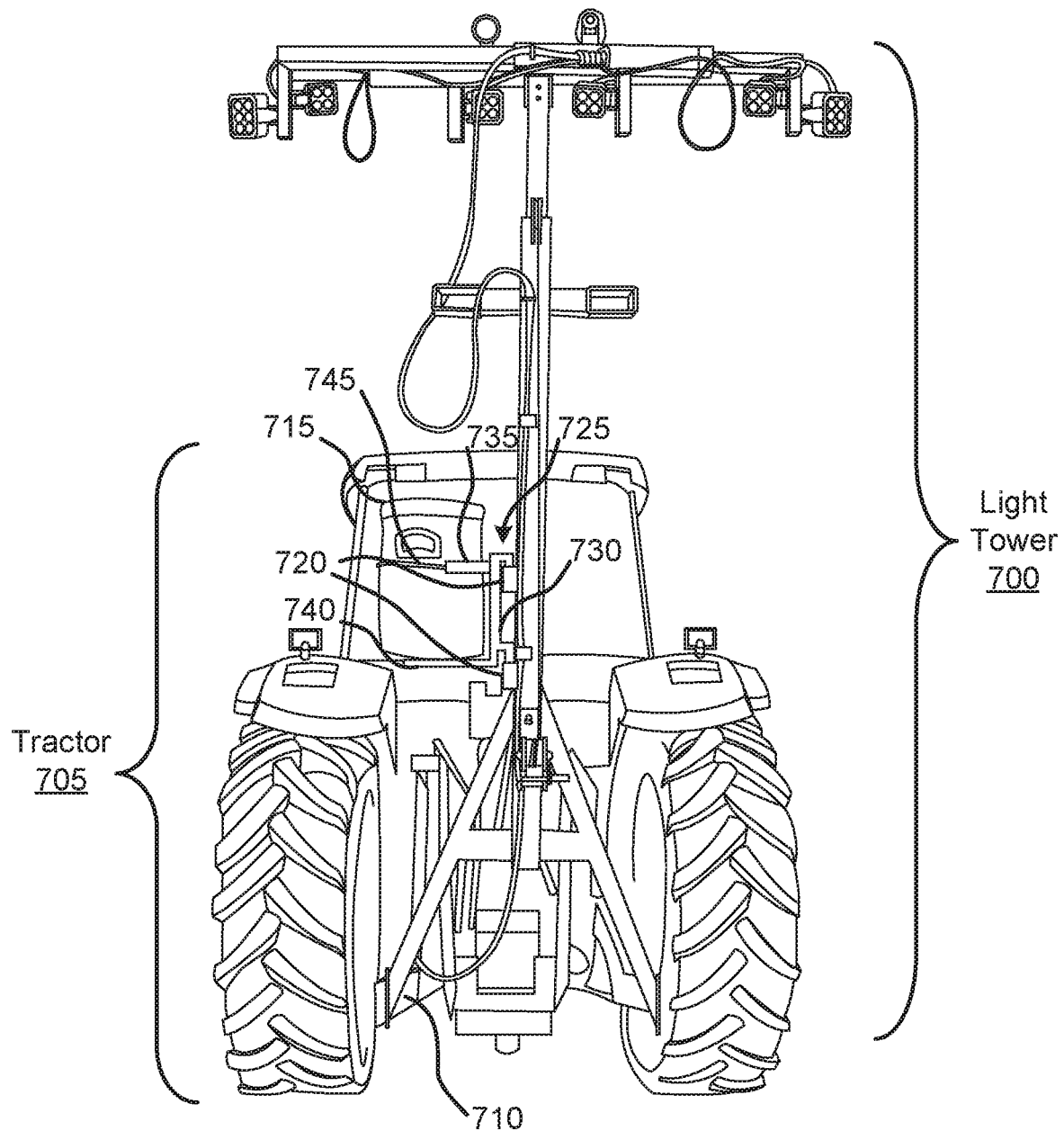
FIG. 7 shows an example of an elevational view of the light tower coupled to a hitch connection of a tractor in accordance with aspects of the present disclosure.
Figure 8:
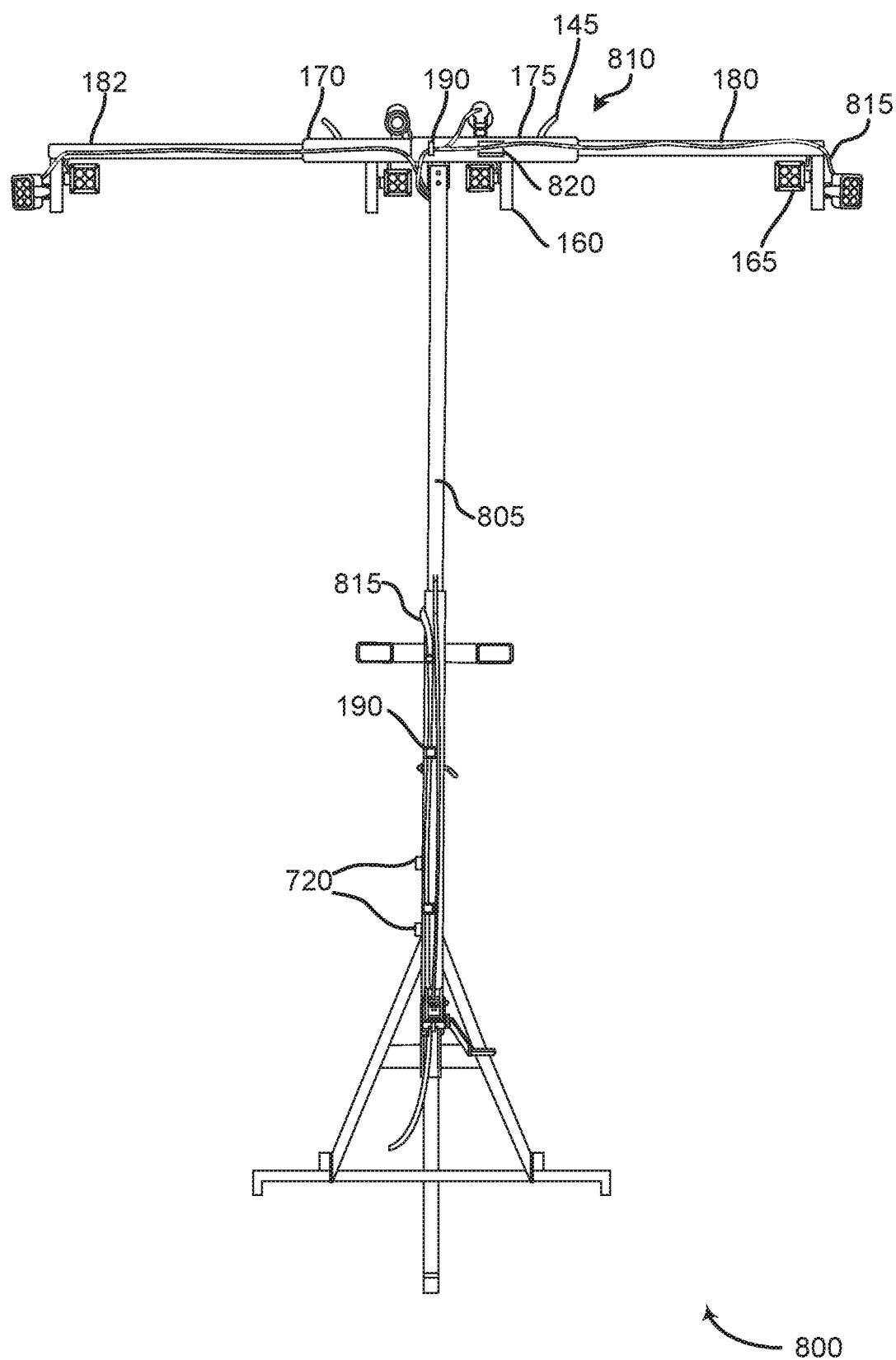
FIG. 8 shows an example of an elevational view of the light tower with the main post and the mounting beam extended in accordance with aspects of the present disclosure.

Each light mounting bar 160 may have zero, one, or a plurality of light fixtures 165 coupled to the light mounting bar 160, depending on the light configuration desired. While in the embodiment shown the light mounting bar length is configured for a maximum of two light fixtures 165 per light mounting bar 160, longer lengths allowing for greater numbers of light fixtures 165 per bar 160 are contemplated. The light fixtures 165 may be removably or non-removably coupled to the light mounting bars 160. In the present embodiment, each light fixture 165 comprises an LED light fixture with 4 (cube) or 6 (rectangular) bulbs. The power cord of each light fixture 165 (for example, as shown in FIGS. 7 and 8) is run across the mounting beam 155 and down the main post 130 to the power source (not shown). In some embodiments, the power source is the electrical system of the tractor. In other embodiments, the light fixtures 165 are powered by a generator. Light fixtures may also be coupled to the top face of the left and/or right outer sleeves 175, 170, as shown in FIG. 1.

The light fixtures 165 may be any shape or type of light fixture suitable for the specific intended function of the light tower 100. In one embodiment the light fixtures 165 are cube-type fixtures. In other embodiments the light fixtures 165 are bar-type fixtures. The light fixtures 165 may also be of any suitable light emitter design, e.g. LED, Halogen, HID (metal halide), etc. The light fixtures 165 may all be the same type of light fixture, or different types of light fixtures may be mounted to the same light tower 100.

In the embodiment shown, the light tower 100 comprises steel. In some embodiments the exterior of the light tower 100 is finished with a powder coating or paint.

The portable light tower 100 may reduce or eliminate the need for a second device or tractor to pull light-generating towers or equipment. The light tower 100 also allows for the tractor to support and move the tower 100, and still allow for a separate trailer to be attached to the tractor. The light fixture mounting locations on the light tower 100 (the light mounting bars 160) allow for expandable and adjustable lighting locations. The light fixtures 165 may include daisy-chain technology for lighting functions and simpler wiring.

Attachment frame 105 may be configured to removably mount to and be supported by a 3-point hitch connection of a tractor. In some examples, the attachment frame 105 includes an A-frame 115 comprising two legs 125 coupled together at an angle and a cross bar 120 interposed between the two legs 125. In some examples, the attachment frame 105, the main post 130, and the mounting beam 155 comprise steel. In some examples, the attachment frame 105 further comprising a vertical brace member 110 coupled to the main post 130. In some examples, the configuration of the attachment frame 105 for attaching to the hitch connection includes being configured to receive one of category 2 and category 3 mounting pins.

Attachment frame 105 may be configured to removably mount to a 3-point hitch connection of a tractor. Attachment frame 105 may be an example of, or include aspects of, the corresponding element or elements described with reference to FIG. 4.

Attachment frame 105 may include brace member 110 and A-frame 115. Brace member 110 may be an example of, or include aspects of, the corresponding element or elements described with reference to FIG. 4. A-frame 115 may be an example of, or include aspects of, the corresponding element or elements described with reference to FIG. 4.

A-frame 115 may include cross bar 120 and legs 125. In some examples, each of the two legs 125 and the cross bar 120 includes at least one hole for coupling to the corresponding attachment point of the hitch connection. Cross bar 120 may be an example of, or include aspects of, the corresponding element or elements described with reference to FIG. 4. Legs 125 may be an example of, or include aspects of, the corresponding element or elements described with reference to FIG. 4.

Main post 130 may have an upper end and a lower end, wherein a lower portion of the main post 130 is rigidly coupled to the attachment frame 105, and wherein a height of the main post 130 is vertically adjustable. In some examples, the main post 130 comprises a lower outer sleeve member 135 and an upper inner sleeve member 140 slidably coupled within the first tube, wherein the outer sleeve member 135 is rigidly coupled to the attachment frame 105.

Figure 10:
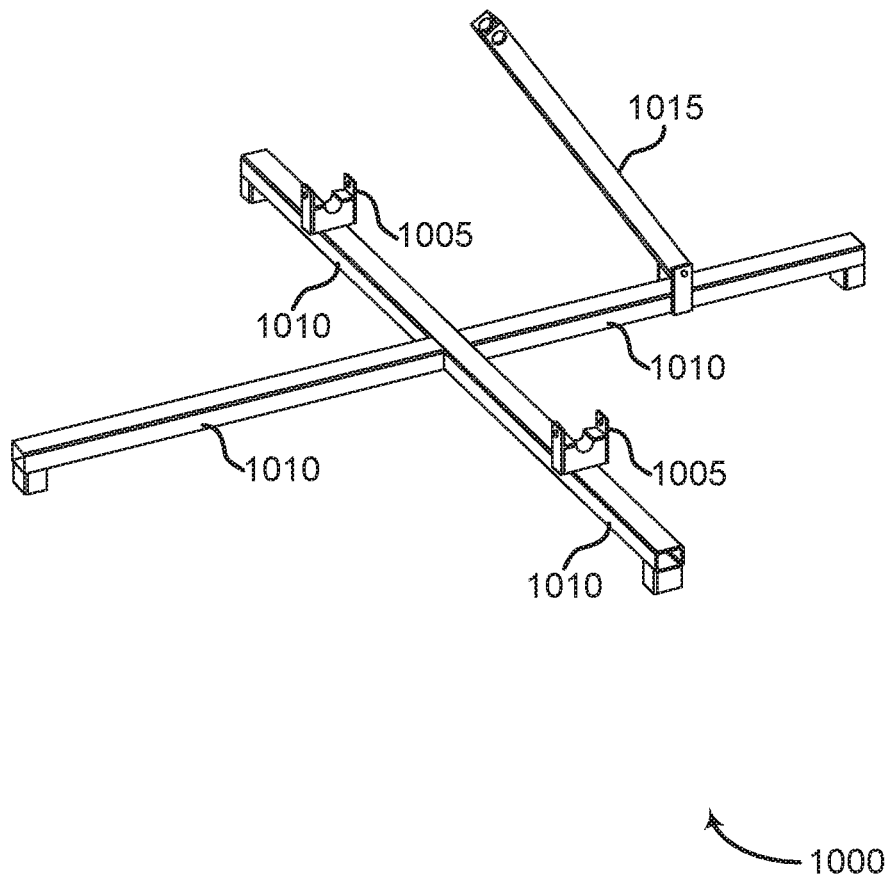
FIG. 10 shows an example of a perspective view of a base apparatus for the light tower in accordance with aspects of the present disclosure.

In some examples, the main post 130 further comprises a plurality of pin lock locations, whereby the height of the main post 130 is fixed by installing a pin 145 in the pin lock (in this embodiment, the pin lock comprises holes located in the sleeves 135, 140). In some examples, the main post 130 additionally comprises two forklift brackets 150, wherein the forklift brackets 150 are coupled to opposite sides of the main post 130, wherein each forklift bracket 150 is configured to receive a fork of a forklift, whereby the portable light tower apparatus 100 is transportable by forklift when the forklift brackets 150 have received the forklift forks. For example, driving the forklift to a location of the light tower 100, operating the forklift to insert the fork of the forklift into the two forklift brackets 150, raising the fork to lift the light tower 100 from the ground, thus supporting the light tower 100 by the forklift, driving the forklift to a second location, operating the forklift fork until the light tower 100 is deposited at the second location, and operating the forklift to remove the fork from the forklift brackets. This operation may be done in conjunction with a light tower support stand or bracket, such as is shown in FIG. 10.

In some examples, the height of the main post 130 is adjustable such that a height of the light tower 100 is adjustable between 3.05 meters (10'-0") and 4.27 meters (14'-0"). In some examples, the main post 130 comprises a plurality of power cable holders 190 coupled to the main post 130 and configured to guide power cables.

Main post 130 may be an example of, or include aspects of, the corresponding element or elements described with reference to FIGS. 5 and 8.

Main post 130 may include outer sleeve member 135, inner sleeve member 140, lock pin 145, and side extensions 150. Outer sleeve member 135 and inner sleeve member 140 may be an example of, or include aspects of, the corresponding element or elements described with reference to FIG. 5.

Mounting beam 155 may be rigidly coupled to the upper end of the main post 130 at a center portion of the mounting beam 155, wherein a left length of the mounting beam 155 and a right length of the mounting beam 155 are independently adjustable, and wherein the mounting beam 155 includes a plurality of vertical light mounting bars 160, wherein each light mounting bar 160 is coupled to the mounting beam 155. In some examples, the left length and the right length of the mounting beam 155 (as measured from the centerline of the main post 130) are each adjustable between 0.81 meters (2'-8") and 1.52 meters (5'-0").

In some examples, the mounting beam 155 includes at least one telescoping portion. In some examples, the mounting beam 155 includes a right inner sleeve 180 slidably adjustable within a right outer sleeve 175, and wherein the mounting beam 155 includes a left inner sleeve 182 slidably adjustable within a left outer sleeve 170, wherein the right outer sleeve 175 and the left outer sleeve 170 are overlapped at a central portion of the mounting beam 155.

Mounting beam 155 may be an example of, or include aspects of, the corresponding element or elements described with reference to FIGS. 6, 8, and 9. Mounting beam 155 may include light mounting bars 160, light fixtures 165, left outer sleeve 170, right outer sleeve 175, left inner sleeve 182, and right inner sleeve 180.

In some examples, the plurality of light mounting bars 160 consists of four light mounting bars 160. In some examples, the plurality of light mounting bars 160 includes one light mounting bar 160 coupled to a left end of the mounting beam 155, and one light mounting bar 160 coupled to the right end of the mounting beam 155. In some examples, each light mounting bar 160 extends downward from the mounting beam 155.

Light mounting bars 160 may be an example of, or include aspects of, the corresponding element or elements described with reference to FIGS. 6 and 9. In some examples, each light fixture 165 is a bar-type light fixture. In some examples, the light fixtures 165 include at least one power cord. Light fixtures 165 may be an example of, or include aspects of, the corresponding element or elements described with reference to FIGS. 8 and 9.

Left outer sleeve 170 and right outer sleeve 175 may be examples of, or include aspects of, the corresponding element or elements described with reference to FIGS. 8 and 9.

Left inner sleeve 182 and right inner sleeve 180 may be examples, or include aspects of, the corresponding element or elements described with reference to FIGS. 8 and 9.

Winch assembly 184 may be coupled to outer sleeve member 135 and inner sleeve member 140, whereby operation of the winch assembly 184 adjusts the height of the main post 130. In some examples, the winch assembly 184 includes a hand crank configured to operate the winch assembly 184. Winch assembly 184 may be an example of, or include aspects of, the corresponding element or elements described with reference to FIG. 5. Winch assembly 184 may include pulley 186 and cable 188. Pulley 186 and cable 188 may be an example of, or include aspects of, the corresponding element or elements described with reference to FIGS. 2, 3, 5, 7, and 8.

Figure 2:
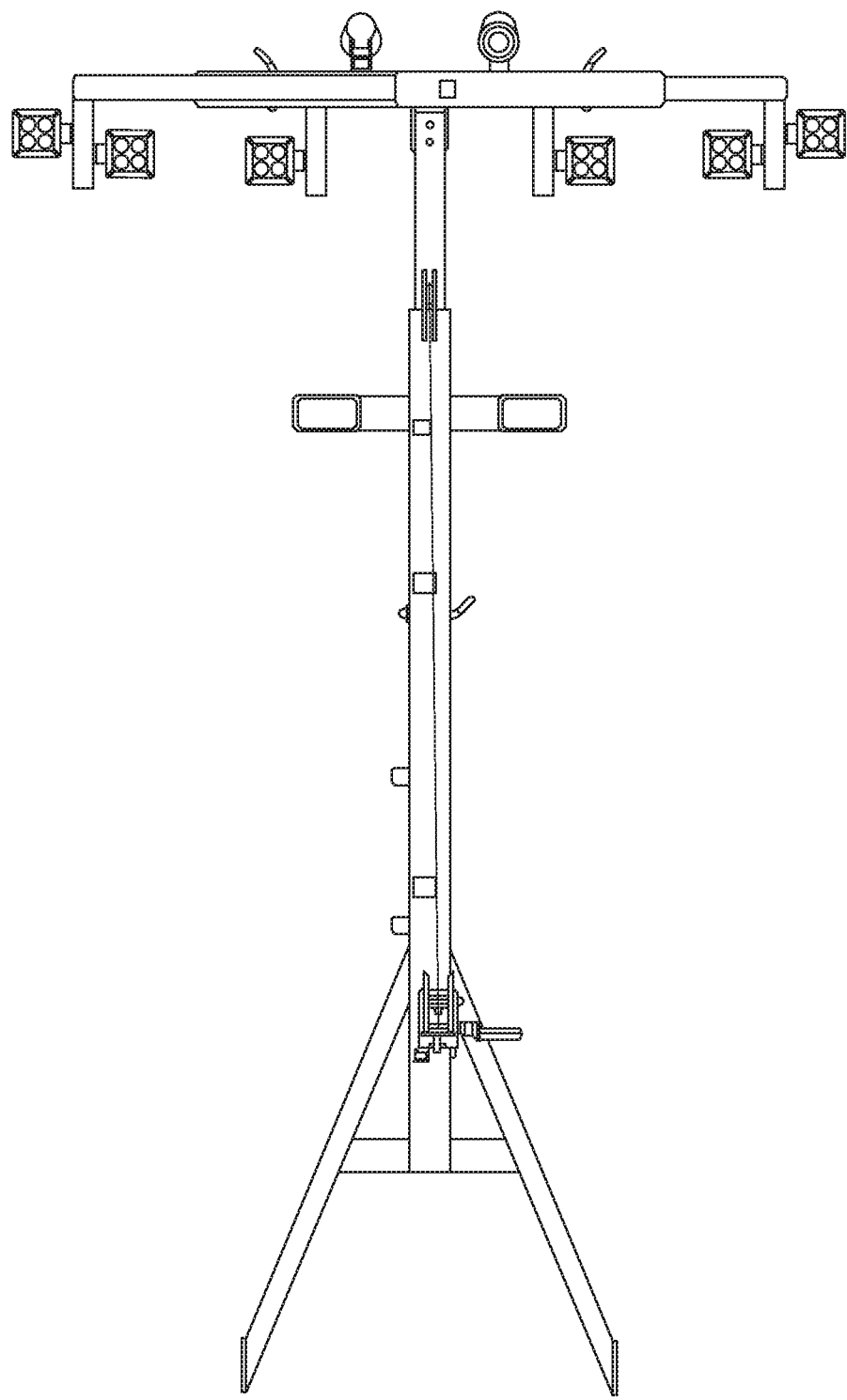
FIG. 2 shows an example of a front elevational view of the light tower in accordance with aspects of the present disclosure.

FIG. 2 shows an example of a front elevational view of the light tower 200 in accordance with aspects of the present disclosure. Light tower 200 may be an example of, or include aspects of, the corresponding element or elements described with reference to FIGS. 1, 3, 7, 8, and 11.

Figure 3:
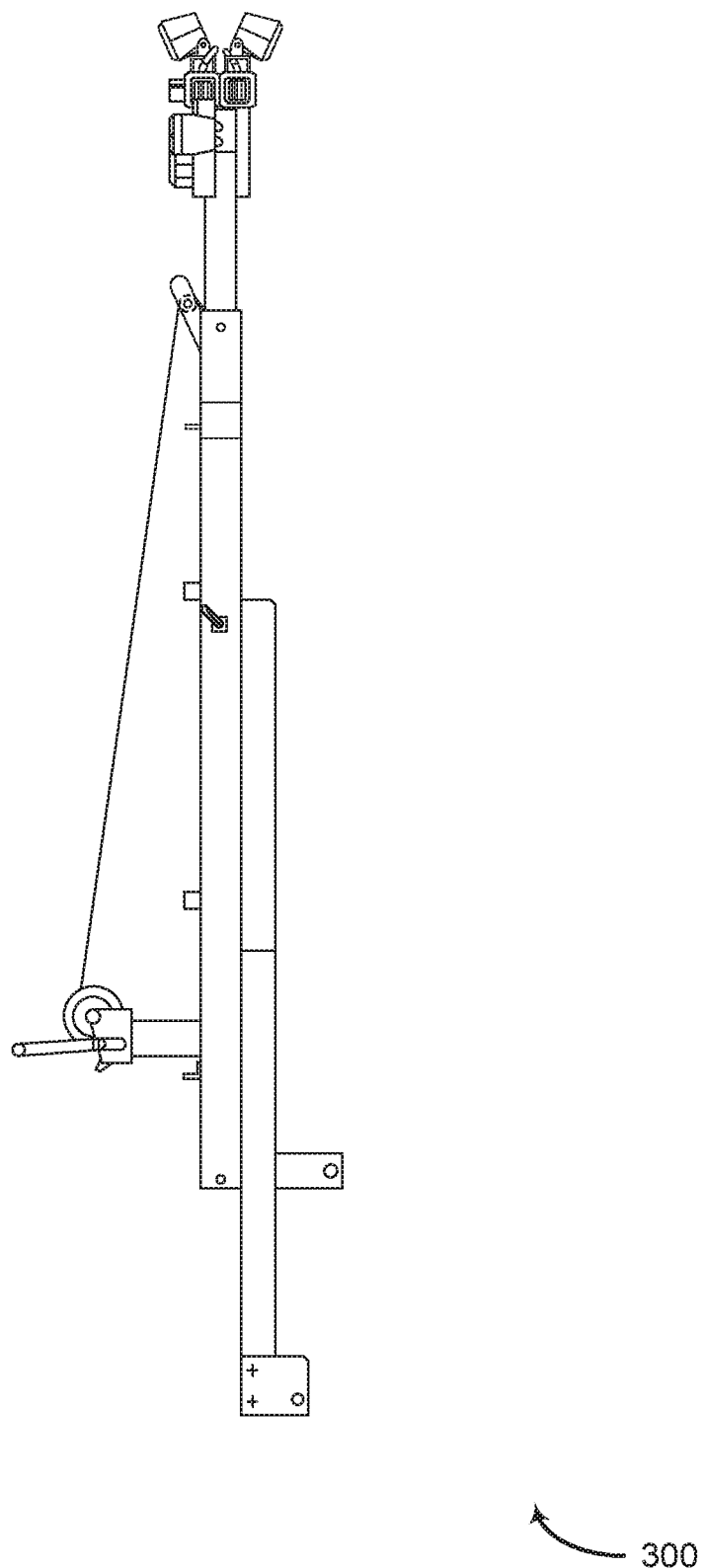
FIG. 3 shows an example of a side elevational view of the light tower in accordance with aspects of the present disclosure.

FIG. 3 shows an example of a side elevational view of the light tower 300 in accordance with aspects of the present disclosure. Light tower 300 may be an example of, or include aspects of, the corresponding element or elements described with reference to FIGS. 1, 2, 7, 8, and 11.

FIG. 4 shows an example of a perspective view of an attachment frame 400 of the light tower in accordance with aspects of the present disclosure. Attachment frame 400 may be an example of, or include aspects of, the corresponding element or elements described with reference to FIG. 1.

Attachment frame 400 may include brace member 405 and A-frame 410. Brace member 405 and A-frame 410 may be examples of, or include aspects of, the corresponding element or elements described with reference to FIG. 1.

A-frame 410 may include legs 415 and cross bar 420. Legs 415 and cross bar 420 may be examples of, or include aspects of, the corresponding element or elements described with reference to FIG. 1.

A-frame 410 may include holes 425 configured for attachment to the 3-point hitch connection of the tractor.

Figure 5:
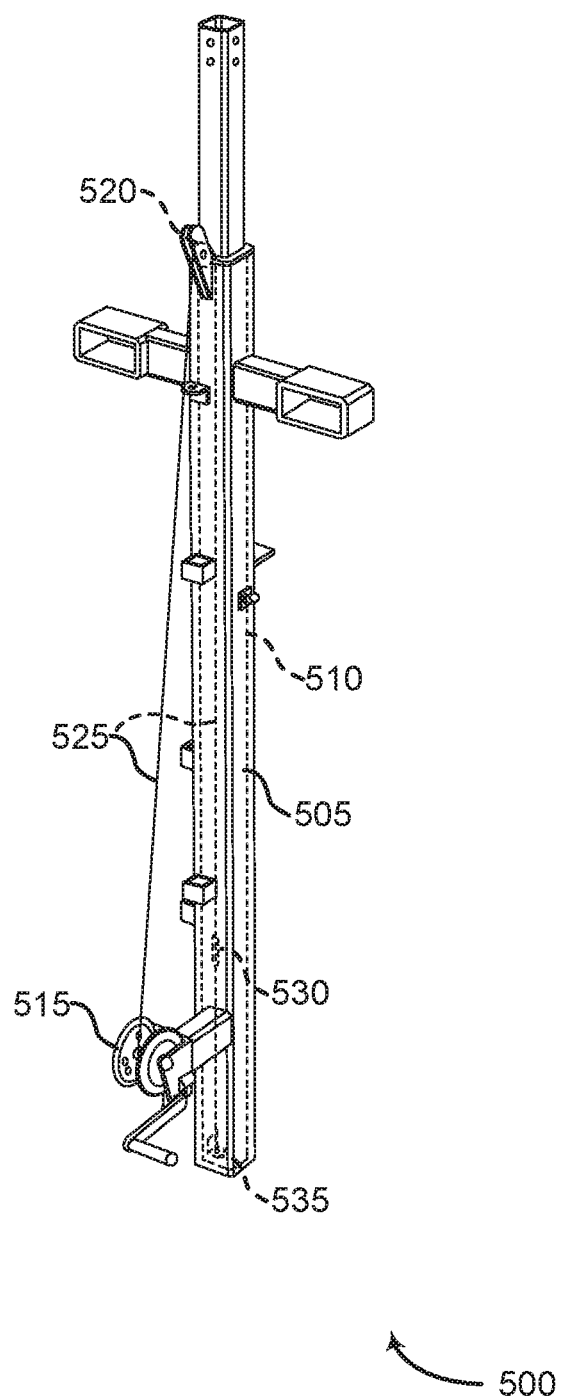
FIG. 5 shows an example of a perspective view of a main post of the light tower in accordance with aspects of the present disclosure.

FIG. 5 shows an example of a perspective view of a main post 500 of the light tower in accordance with aspects of the present disclosure. Main post 500 may be an example of, or include aspects of, the corresponding element or elements described with reference to FIGS. 1 and 8.

Main post 500 may include outer sleeve member 505, inner sleeve member 510, and winch assembly 515. Outer sleeve member 505 and inner sleeve member 510 and winch assembly 515 may be examples of, or include aspects of, the corresponding element or elements described with reference to FIG. 1.

Winch assembly 515 may include pulley 520 and cable 525. Pulley 520 and cable 525 may be examples of, or include aspects of, the corresponding element or elements described with reference to FIG. 1. A cable 525 connects a winch assembly 515 to a pulley 520 coupled to an upper end of the main post outer sleeve member 505. The cable 525 then runs down from the pulley 520 through a slot 530 in the main post inner sleeve member 510 and down the interior of the main post inner sleeve member 510 where it is anchored to the main post inner sleeve member 510 proximate to the lower end of the main post inner sleeve member 510. In the present embodiment bracket 535 is coupled to the interior of the inner sleeve member 510 and the cable 525 is coupled to the bracket 535.

Figure 6:
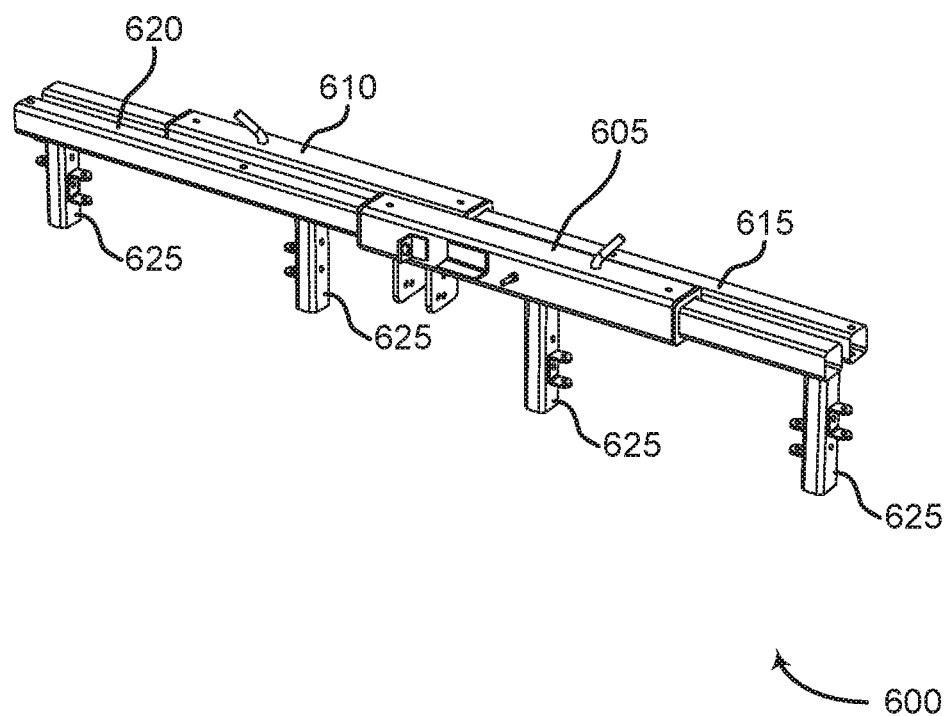
FIG. 6 shows an example of a perspective view of mounting beam of the light tower in accordance with aspects of the present disclosure.

FIG. 6 shows an example of a perspective view of mounting beam 600 of the light tower in accordance with aspects of the present disclosure. Mounting beam 600 may be an example of, or include aspects of, the corresponding element or elements described with reference to FIGS. 1, 8, and 9.

Mounting beam 600 may include right outer sleeve 605, left outer sleeve 610, right inner sleeve 620, left inner sleeve 615, and light mounting bars 625. Right outer sleeve 605, left outer sleeve 610, right inner sleeve 620, and left inner sleeve 615 may be examples of, or include aspects of, the corresponding element or elements described with reference to FIG. 1. Light mounting bars 625 may be an example of, or include aspects of, the corresponding element or elements described with reference to FIGS. 1 and 9.

FIG. 7 shows an example of an elevational view of the light tower 700 coupled to a hitch connection 710 of a tractor 705 in accordance with aspects of the present disclosure. The example shown includes light tower 700 and tractor 705. Light tower 700 may be an example of, or include aspects of, the corresponding element or elements described with reference to FIGS. 1-8, and 11.

Tractor 705 may include hitch connection 710. In some examples, the hitch connection 710 consists of three attachment points, and wherein each of the two legs and the cross bar are configured for coupling to corresponding attachment points of the hitch connection 710.

The light tower 700 may include at least one accessory bracket 720 configured for direct attachment to an accessory and/or an accessory holder. In the example shown in FIG. 7, accessory holder 725 is coupled to and supported by the light tower 700 via the accessory brackets 720. An accessory, in this example a water cooler 715, is coupled to the accessory holder 725 and is thereby configured to be transported along with the light tower 700. The locations and configurations of the accessory brackets 720 are varied depending on the desired accessory to be supported.

In the embodiment shown in FIG. 7, the accessory holder 725 for holding the cylindrical water cooler 720 comprises a generally vertical bracket 730 including an upper and lower dogleg portion, each of which is inserted into the corresponding accessory bracket 720, whereby the bracket 730 is removably coupled to the light tower 700. The accessory holder 725 includes a horizontal upper curved element 735 coupled to an upper portion of the bracket 730. The curved element 735 is generally configured to receive the outer surface of the cylindrical water cooler 715. After the water cooler 715 is placed proximate to the upper curved bracket 735, a removable cord 745 is connected between the ends of the curved element 735 such that the water cooler 715 is interposed between the cord 745 and the curved bracket 735, holding the water cooler 715 laterally in place. The water cooler 715 is supported vertically by the generally horizontal support member 740 coupled to and extending outward from a lower portion of the bracket 730. In this way the water cooler 715 is removably coupled to the light tower 700 and may be conveniently transported along with the light tower 700, as well as being conveniently accessible while mounted to the light tower 700.

FIG. 8 shows an example of an elevational view of the light tower 800 with the main post 805 and the mounting beam 810 extended in accordance with aspects of the present disclosure. Light tower 800 may be an example of, or include aspects of, the corresponding element or elements described with reference to FIGS. 1-3, 7, and 11.

Light tower 800 may include main post 805 and mounting beam 810. Main post 805 may be an example of, or include aspects of, the corresponding element or elements described with reference to FIGS. 1 and 5. Mounting beam 810 may be an example of, or include aspects of, the corresponding element or elements described with reference to FIGS. 1, 6, and 9.

FIG. 8 shows an example of the light tower 800 with the main post 805 extended upwards and each of the inner sleeves 182, 180 of the mounting beam 800 extended outwards, i.e. such that the mounting beam 800 is at its furthest extension. Specifically, right inner sleeve 180 has been slid rightward within right outer sleeve 175 and anchored, for example using the pin connection 145. Similarly, the left inner sleeve 182 has been slid leftward within left outer sleeve 170 and anchored in position. In the present embodiment multiple pin holes are provided in each of the inner sleeves 180, 182, in order to provide multiple adjustment points. In the present embodiment, up to and including 4 adjustments holes are provided, although greater numbers of adjustment holes are contemplated if desirable for greater adjustability.

Additionally, a plurality of electrical cables/power cords 815 are shown. The power cords 815 connect and supply power to each of the light fixtures 165. Power cord holders 190 are optionally provided in various locations and configuration to route the power cords 815 along the light tower 800 to the power source (not shown). Additional brackets such as the support bracket 820 may be optionally provided to support auxiliary devices. In one embodiment, the power cords 815 are connected to and powered by an electrical system of the tractor.

Figure 9:
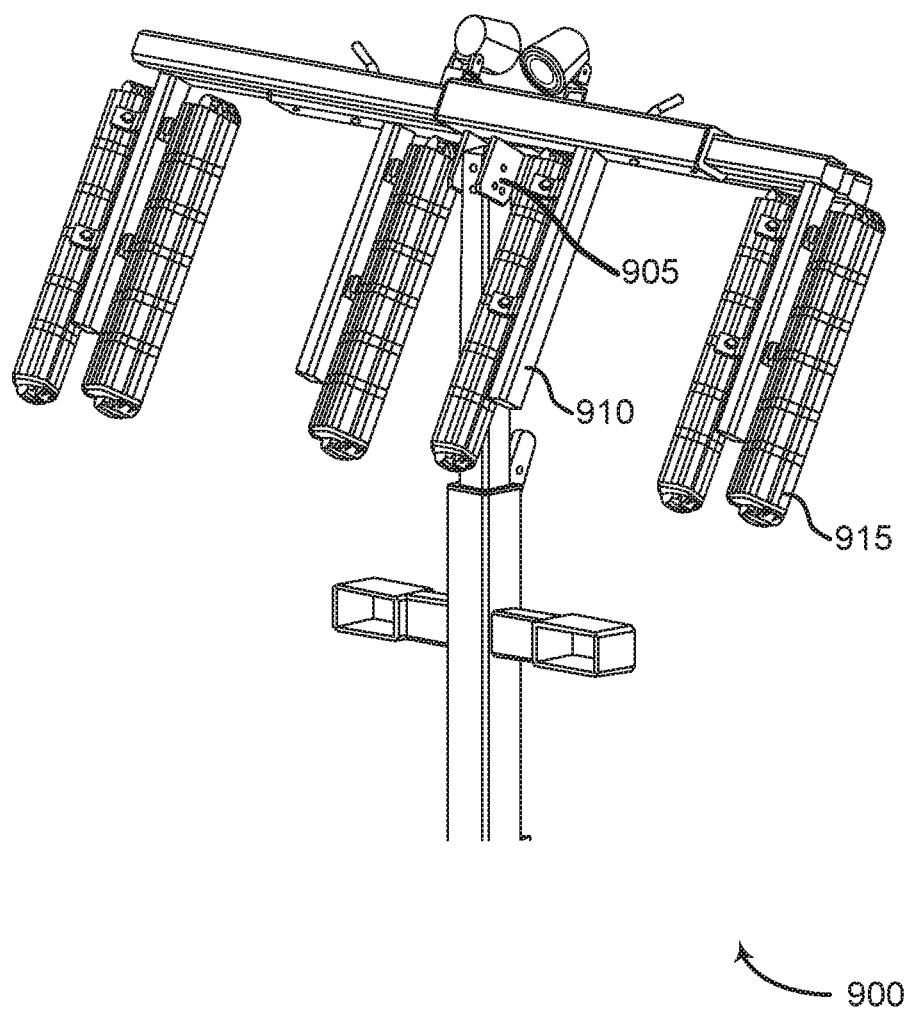
FIG. 9 shows an example of a perspective view of a mounting beam in another embodiment of the light tower in accordance with aspects of the present disclosure.

FIG. 9 shows an example of a perspective view of a mounting beam 900 in another embodiment of the light tower in accordance with aspects of the present disclosure. Mounting beam 900 may be an example of, or include aspects of, the corresponding element or elements described with reference to FIGS. 1, 6, and 8. Mounting beam 900 may include pivoting connection 905, light mounting bars 910, and light fixtures 915.

In some embodiments, each light mounting bar 910 is configured for coupling to a vertically-oriented light fixture 915. In the embodiment shown, each light fixture 915 is coupled to the corresponding light mounting bar 910 at two locations, but fewer or more mounting locations may be used, depending on the length of the light fixture 915. The light bars shown in FIG. 9 are approximately 22 inches (0.56 meters) long. The embodiment shown in FIG. 9 also includes a pivoting connection 905 between the main post and the mounting beam 900, such that pivoting the connection angles the light bars from vertical. In the embodiment shown, the two lock pin holes are provided for fixing the angle of the light bars (at 0 degrees (vertical) and at an approximately 30 degree angle).

Light mounting bars 910 may be an example of, or include aspects of, the corresponding element or elements described with reference to FIGS. 1 and 6. Light fixtures 915 may be an example of, or include aspects of, the corresponding element or elements described with reference to FIG. 1.

FIG. 10 shows an example of a perspective view of a base apparatus 1000 for the light tower in accordance with aspects of the present disclosure. Base apparatus 1000 may be an example of, or include aspects of, the corresponding element or elements described with reference to FIG. 11. Base apparatus 1000 may include mounting bracket 1005, horizontal legs 1010, and kickstand 1015.

A base apparatus 1000 is used to support the light tower on a generally horizontal surface when the light tower is not coupled to the tractor. The base apparatus 1000 includes four horizontal legs 1010 coupled together in a cruciform shape. Two opposite legs each include a mounting bracket 1005 configured to receive the hitch mounting pin when the mounting pin is coupled to the lower end of the A-frame leg.

In the embodiment shown, the mounting bracket 1005 comprises a tube portion coupled to a top face of the horizontal leg and including a notch configured to receive the mounting pin. After the mounting pin is seated in and supported by the mounting bracket 1005, an additional holding pin may be inserted in the mounting bracket 1005 above the mounting pin to prevent the mounting pin from lifting off the bracket. In the present embodiment the horizontal legs 1010 are rectangular tube shapes. The length of the horizontal legs 1010 is configured to provide required stability to the light tower when supported on the ground, thus preventing the light tower from tipping over during anticipated usage conditions.

A kickstand 1015 member is rotatably coupled to another leg of the horizontal legs 1010 such that the kickstand 1015 member can be rotated upward such that the kickstand 1015 member is then in a position to couple to the mounting hitch connection on the A-frame using the mounting pin. In the present embodiment, the kickstand 1015 is a rectangular tube shape.

Figure 11:
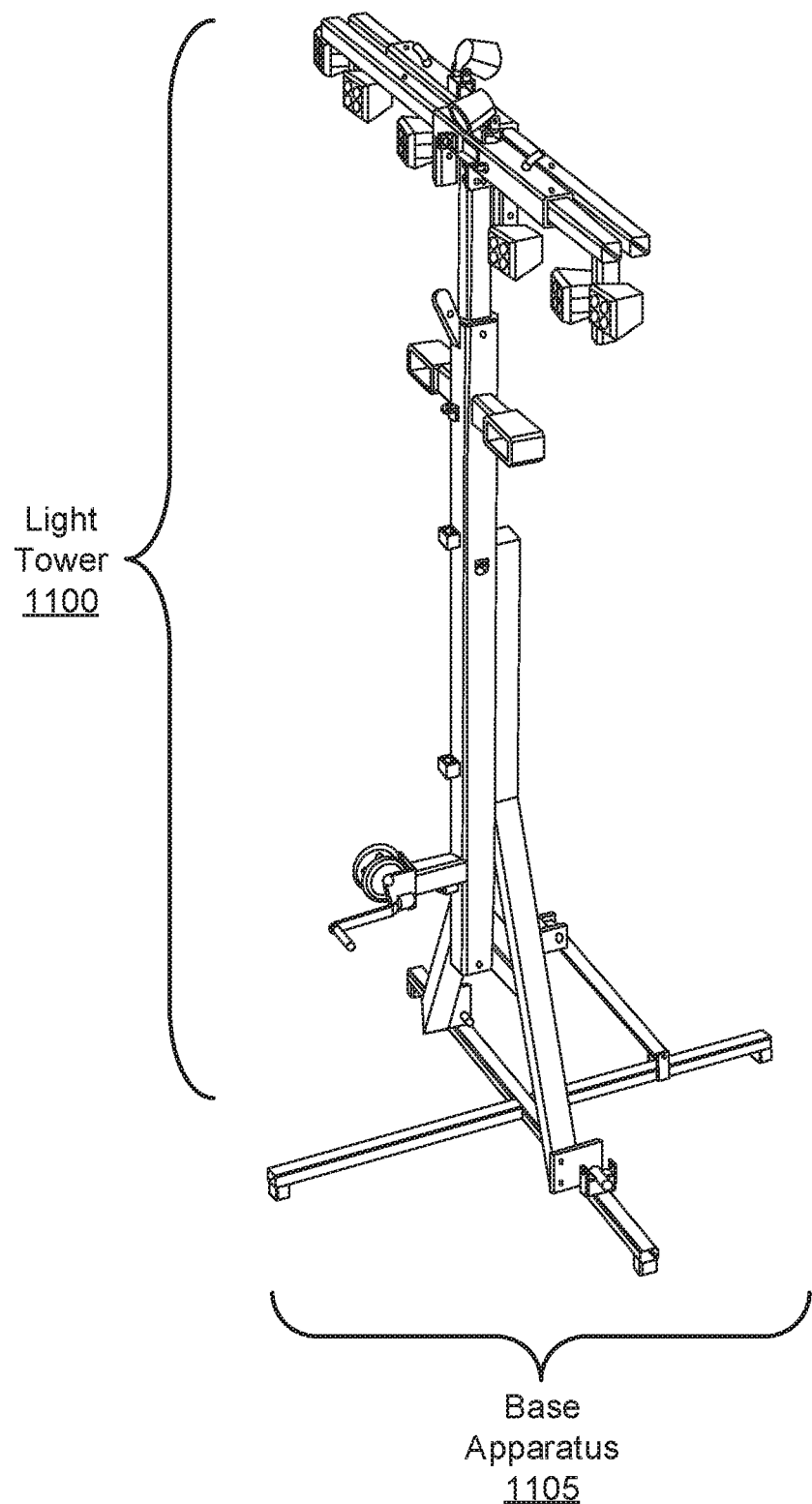
FIG. 11 shows an example of a perspective view of the light tower coupled to the base apparatus in accordance with aspects of the present disclosure.

FIG. 11 shows an example of a perspective view of the light tower 1100 coupled to the base apparatus 1105 in accordance with aspects of the present disclosure. The example shown includes light tower 1100 and base apparatus 1105. Light tower 1100 may be an example of, or include aspects of, the corresponding element or elements described with reference to FIGS. 1-3, 7, and 8. Base apparatus 1105 may be an example of, or include aspects of, the corresponding element or elements described with reference to FIG. 10.

Figure 12:
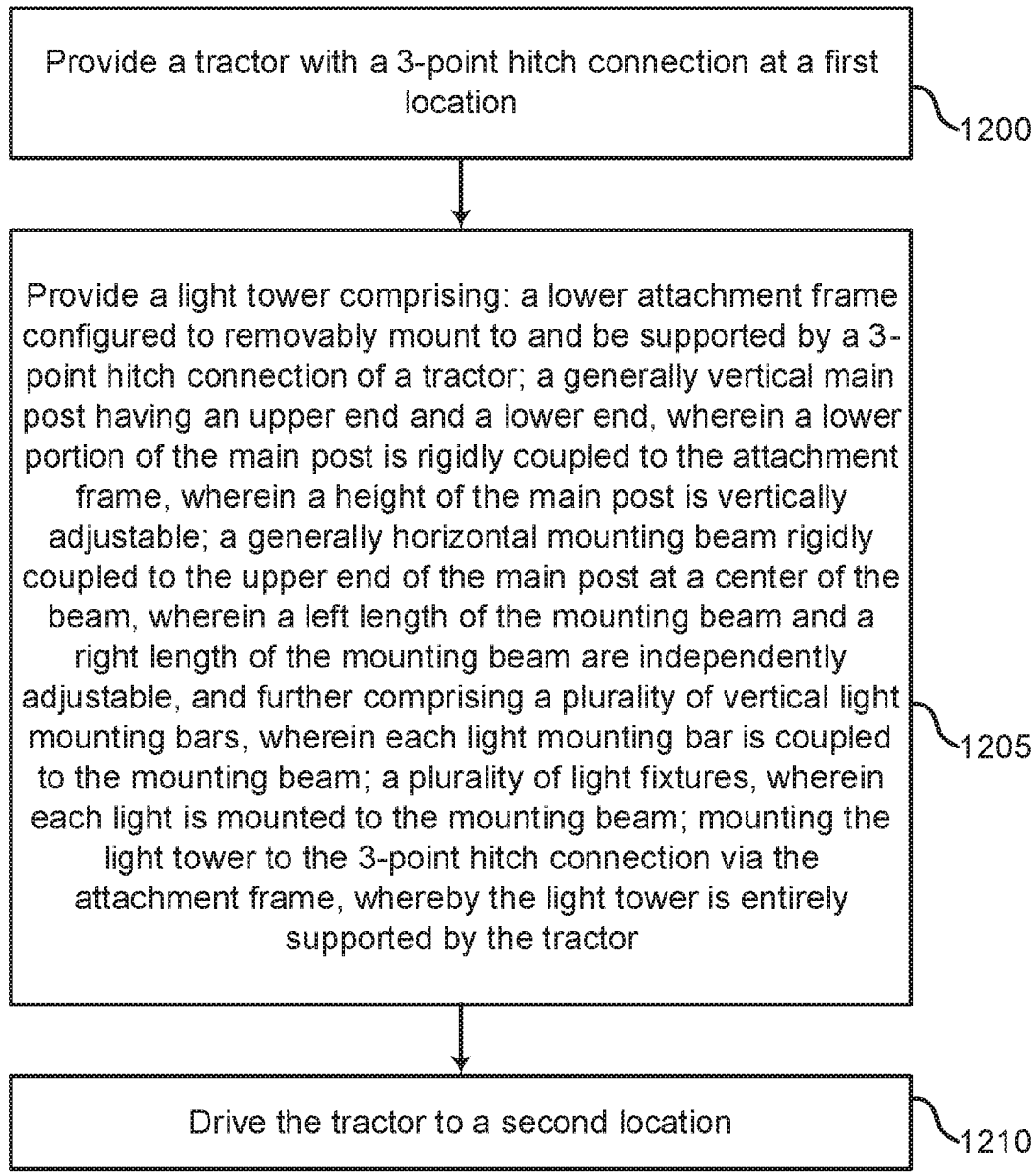
FIGS. 12 through 13 show examples of a process for moving a portable light tower in accordance with aspects of the present disclosure.

FIG. 12 shows an example of a process for moving a portable light tower in accordance with aspects of the present disclosure. In some examples, these operations may be performed using special-purpose hardware. Generally, these operations may be performed according to the methods and processes described in accordance with aspects of the present disclosure. For example, the operations may be composed of various substeps, or may be performed in conjunction with other operations described herein.

At step 1200, the user may provide a tractor with a 3-point hitch connection at a first location.

At step 1205, the user may provide a light tower comprising: a lower attachment frame configured to removably mount to and be supported by a 3-point hitch connection of a tractor; a generally vertical main post having an upper end and a lower end, wherein a lower portion of the main post is rigidly coupled to the attachment frame, wherein a height of the main post is vertically adjustable; a generally horizontal mounting beam rigidly coupled to the upper end of the main post at a center of the beam, wherein a left length of the mounting beam and a right length of the mounting beam are independently adjustable, and further comprising a plurality of vertical light mounting bars, wherein each light mounting bar is coupled to the mounting beam; a plurality of light fixtures, wherein each light is mounted to the mounting beam; mounting the light tower to the 3-point hitch connection via the attachment frame, whereby the light tower is entirely supported by the tractor.

At step 1210, the user may drive the tractor to a second location.

Figure 13:
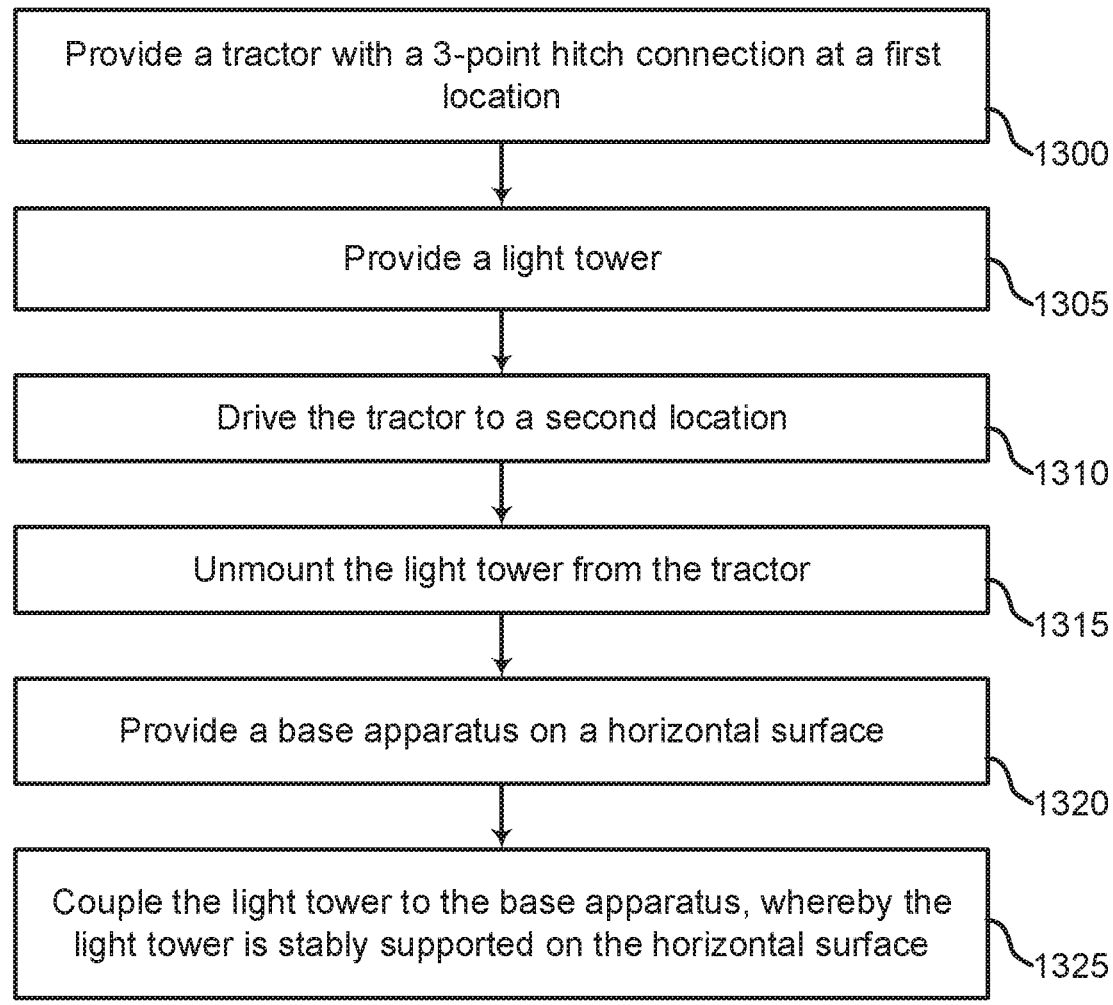

FIG. 13 shows an example of a process for moving a portable light tower in accordance with aspects of the present disclosure. In some examples, these operations may be performed using special-purpose hardware. Generally, these operations may be performed according to the methods and processes described in accordance with aspects of the present disclosure. For example, the operations may be composed of various substeps, or may be performed in conjunction with other operations described herein.

At step 1300, the user may provide a tractor with a 3-point hitch connection at a first location.

At step 1305, the user may provide a light tower comprising: a lower attachment frame configured to removably mount to and be supported by a 3-point hitch connection of a tractor; a generally vertical main post having an upper end and a lower end, wherein a lower portion of the main post is rigidly coupled to the attachment frame, wherein a height of the main post is vertically adjustable; a generally horizontal mounting beam rigidly coupled to the upper end of the main post at a center of the beam, wherein a left length of the mounting beam and a right length of the mounting beam are independently adjustable, and further comprising a plurality of vertical light mounting bars, wherein each light mounting bar is coupled to the mounting beam; a plurality of light fixtures, wherein each light is mounted to the mounting beam; mounting the light tower to the 3-point hitch connection via the attachment frame, whereby the light tower is entirely supported by the tractor.

At step 1310, the user may drive the tractor to a second location.

At step 1315, the user may unmount the light tower from the tractor.

At step 1320, the user may provide a base apparatus on a generally horizontal surface, wherein the base apparatus is configured to couple to the attachment frame.

At step 1325, the user may couple the light tower to the base apparatus, whereby the light tower is stably supported on the horizontal surface.

While the invention herein disclosed has been described by means of specific embodiments, examples and applications thereof, numerous modifications and variations could be made thereto by those skilled in the art without departing from the scope of the invention set forth in the claims.

What is claimed is:

1. A portable apparatus for mounting lights, comprising:
an attachment frame configured to removably mount to and be supported by a 3-point hitch connection of a tractor, wherein the 3-point hitch connection of the tractor includes two lower attachment points at a lower elevation and one upper attachment point at an upper elevation, wherein the removable mounting further comprises the attachment frame being configured to removably couple to each attachment point, and wherein the attachment frame is further configured such that when the attachment frame is removably coupled to the tractor a trailer is simultaneously attachable to the tractor;
a generally vertical main post having an upper end and a lower end, wherein a lower portion of the main post is rigidly coupled to the attachment frame;
an adjustable mounting beam rigidly coupled to the upper end of the main post; and
a plurality of light mounting bars, wherein each light mounting bar is coupled to the mounting beam such that adjusting the mounting beam adjusts a location of at least one light mounting bar.

2. The portable apparatus of claim 1, wherein:
the attachment frame includes an A-frame portion comprising two legs coupled together at an angle and a cross bar interposed between the two legs.

3. The portable apparatus of claim 2, wherein:
each of the two legs is configured for coupling to one of the lower attachment points of the hitch connection and the cross bar is configured for coupling to the upper attachment point of the hitch connection.

4. The portable apparatus of claim 2, wherein:
the mounting beam is oriented in the same general plane as the A-frame portion of the attachment frame.

5. The portable apparatus of claim 1, wherein:
the attachment frame, the main post, and the mounting beam comprise steel.

6. The portable apparatus of claim 1, wherein:
the main post comprises two forklift brackets, wherein the forklift brackets are coupled to opposite sides of the main post, wherein each forklift bracket is configured to receive a fork of a forklift, whereby the portable apparatus is transportable by forklift when the forklift brackets have received the forklift forks.

7. The portable apparatus of claim 1, wherein:
the attachment frame further comprises a vertical brace member coupled to the main post.

8. The portable apparatus of claim 1, wherein:
the configuration of the attachment frame for attaching to the hitch connection includes being configured to receive one of category 2 and category 3 mounting pins.

9. The portable apparatus of claim 1, wherein:
the plurality of light mounting bars includes a light mounting bar coupled to a left end of the mounting beam, and a light mounting bar coupled to the right end of the mounting beam.

10. The portable apparatus of claim 1, further comprising a mechanism mounted on the apparatus and configured to adjust the mounting beam when operated.

11. The portable apparatus of claim 10, wherein the main post includes a tube member.

12. The portable apparatus of claim 1, wherein:
the main post includes a tube member.

13. A portable light tower, comprising:
an attachment frame configured to removably mount to a 3-point hitch connection of a tractor, wherein the 3-point hitch connection of the tractor includes two lower attachment points at a lower elevation and one upper attachment point at an upper elevation, wherein the removable mounting further comprises the attachment frame being configured to removably couple to each attachment point, and wherein the attachment frame is further configured such that when the attachment frame is removably coupled to the tractor a trailer is simultaneously attachable to the tractor;
a generally vertical main post having an upper end and a lower end, wherein a lower portion of the main post is rigidly coupled to the attachment frame; and
an adjustable mounting beam rigidly coupled to the upper end of the main post; and
at least one light fixture, wherein each light fixture is mounted to the mounting beam.

14. The portable light tower of claim 13, wherein:
each light fixture is configured to be powered by an electrical system of the tractor.

15. The portable light tower of claim 13, wherein:
the at least one light fixture includes at least one power cord.

16. The portable apparatus of claim 13, further comprising a mechanism mounted on the apparatus and configured to adjust the mounting beam when operated.

17. The portable apparatus of claim 14, further comprising a plurality of light mounting bars, wherein each light mounting bar is coupled to the mounting beam and each light fixture is coupled to one light mounting bar.

* * * * *

UNITED STATES PATENT AND TRADEMARK OFFICE
CERTIFICATE OF CORRECTION

PATENT NO. : 11,262,033 B2
APPLICATION NO. : 17/139608
DATED : March 1, 2022
INVENTOR(S) : Paine et al.

It is certified that error appears in the above-identified patent and that said Letters Patent is hereby corrected as shown below:

In the Claims
Claim 16, Column 14, Line 27, delete "apparatus" and insert --light tower--.
Claim 17, Column 14, Line 30, delete "apparatus" and insert --light tower--.

Signed and Sealed this
Fifth Day of July, 2022

Katherine Kelly Vidal
*Director of the United States Patent and Trademark Office*